(12) United States Patent
Yamamoto et al.

(10) Patent No.: US 8,450,937 B2
(45) Date of Patent: May 28, 2013

(54) HIGH-PRESSURE DISCHARGE LAMP LIGHTING DEVICE, HIGH-PRESSURE DISCHARGE LAMP UTILIZING THE SAME, PROJECTOR UTILIZING SAID HIGH-PRESSURE DISCHARGE LAMP, AND HIGH-PRESSURE DISCHARGE LAMP LIGHTING METHOD

(75) Inventors: Masahiro Yamamoto, Osaka (JP); Syunsuke Ono, Osaka (JP); Minoru Ozasa, Kyoto (JP)

(73) Assignee: Panasonic Corporation, Osaka (JP)

( * ) Notice: Subject to any disclaimer, the term of this patent is extended or adjusted under 35 U.S.C. 154(b) by 171 days.

(21) Appl. No.: 13/055,917

(22) PCT Filed: Oct. 19, 2009

(86) PCT No.: PCT/JP2009/005451
§ 371 (c)(1),
(2), (4) Date: Jan. 25, 2011

(87) PCT Pub. No.: WO2010/050142
PCT Pub. Date: May 6, 2010

(65) Prior Publication Data
US 2011/0121746 A1    May 26, 2011

(30) Foreign Application Priority Data
Oct. 29, 2008 (JP) ................................ 2008-278240

(51) Int. Cl.
*H05B 41/36* (2006.01)

(52) U.S. Cl.
USPC ..................... 315/209 R; 315/291

(58) Field of Classification Search
USPC .................. 315/200 R, 209 R, 224, 225, 291, 315/307, 308, 326, DIG. 7
See application file for complete search history.

(56) References Cited

U.S. PATENT DOCUMENTS

| | | | |
|---|---|---|---|
| 6,232,725 B1 | 5/2001 | Derra et al. | |
| 6,590,348 B2 * | 7/2003 | Takahashi et al. | 315/209 R |
| 2002/0047643 A1 | 4/2002 | Takahashi et al. | |
| 2004/0000880 A1 | 1/2004 | Ozasa et al. | |
| 2009/0200954 A1 * | 8/2009 | Li et al. | 315/246 |
| 2010/0277085 A1 * | 11/2010 | Okawa | 315/209 R |

FOREIGN PATENT DOCUMENTS

| | | |
|---|---|---|
| JP | 2002-134287 | 5/2002 |
| JP | 2002-532866 | 10/2002 |
| JP | 2003-257689 | 9/2003 |
| JP | 2003-338394 | 11/2003 |
| JP | 2004-134176 | 4/2004 |
| JP | 2004-165006 | 6/2004 |
| JP | 2005-327661 | 11/2005 |

* cited by examiner

Primary Examiner — Jimmy Vu

(57) ABSTRACT

A first waveform (a rectangular waveform, for example) is applied as the waveform of the alternating current supplied to a high-pressure discharge lamp for a predetermined time from the beginning of lighting of the lamp and a second waveform (a staircase waveform, for example) is applied as the waveform of the alternating current after the elapse of a predetermined time (100 [s], for example). The alternating current with the first waveform has a lower absolute instantaneous value in a final section of each half-cycle period thereof than in the other sections and the alternating current with the second waveform has a higher absolute instantaneous value in a final section of each half-cycle period thereof than in the other sections.

20 Claims, 12 Drawing Sheets

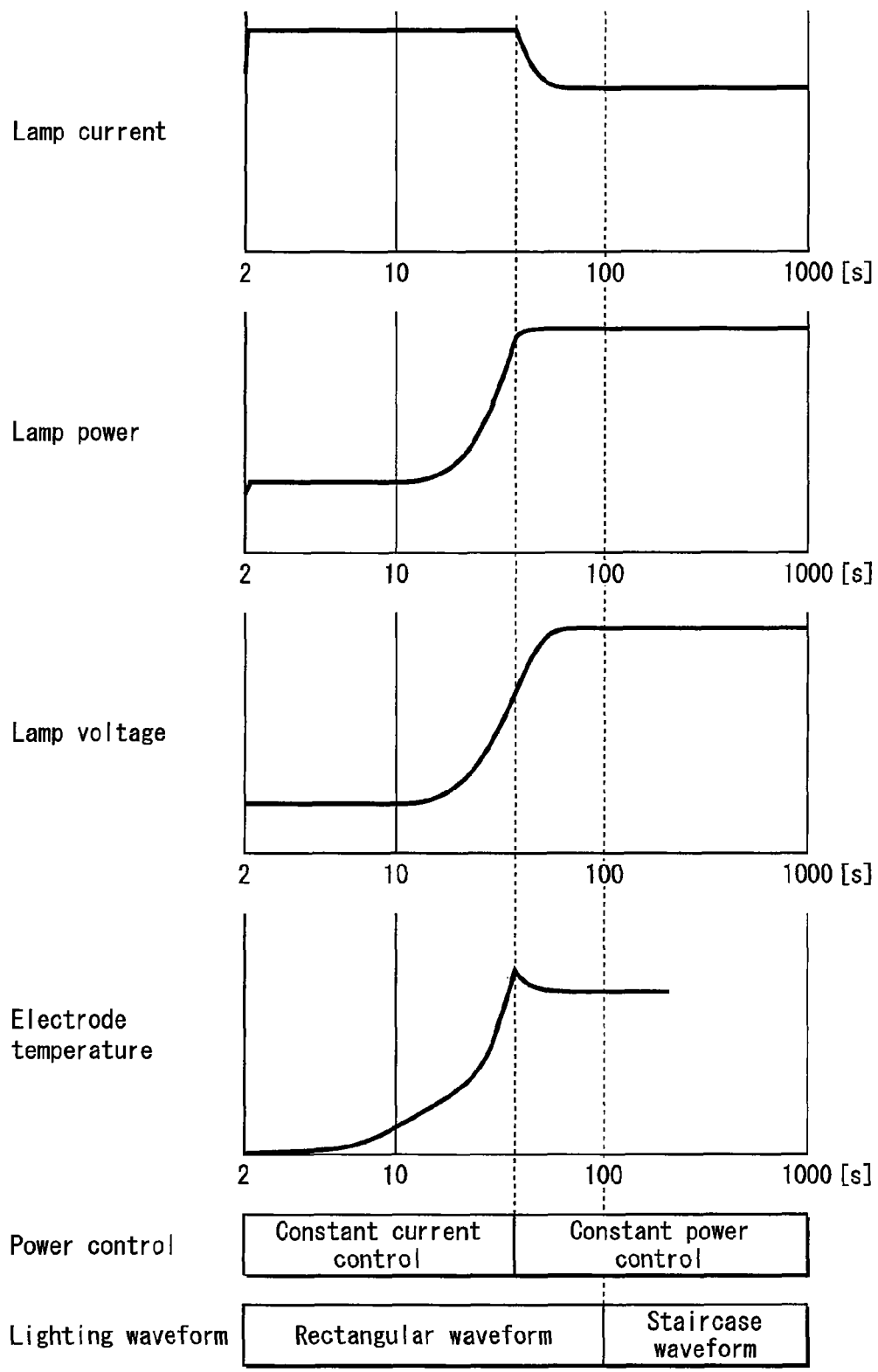

FIG. 4A
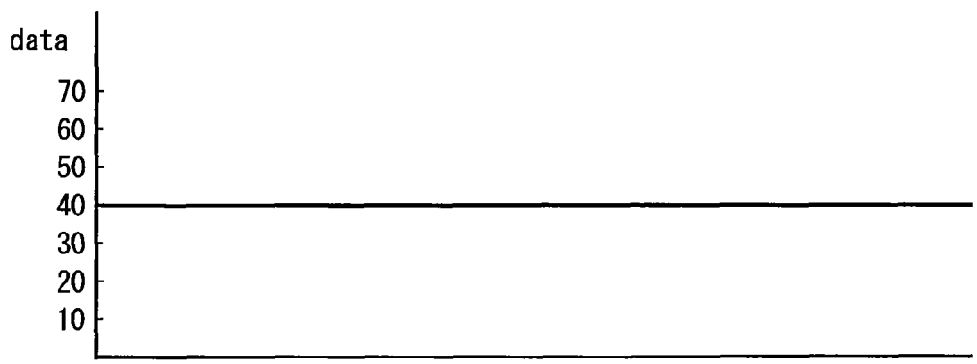
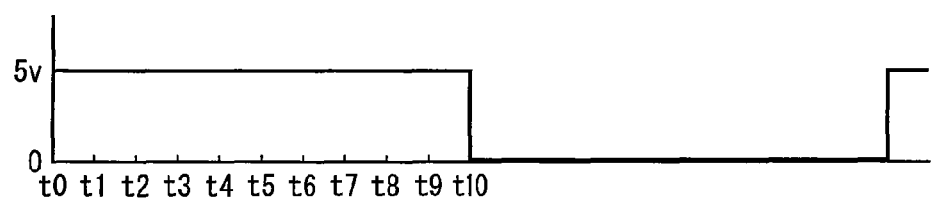
FIG. 4B
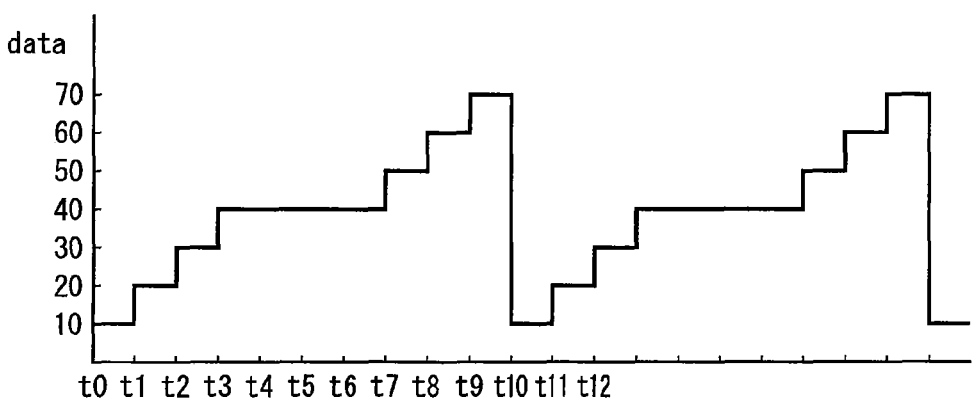
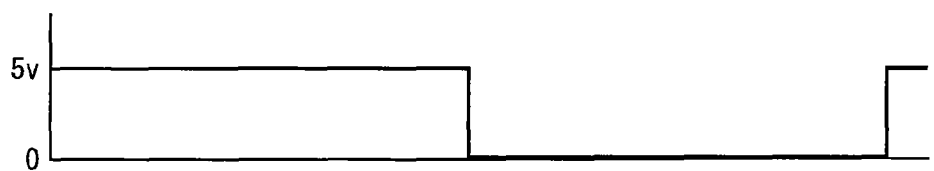

HIGH-PRESSURE DISCHARGE LAMP LIGHTING DEVICE, HIGH-PRESSURE DISCHARGE LAMP UTILIZING THE SAME, PROJECTOR UTILIZING SAID HIGH-PRESSURE DISCHARGE LAMP, AND HIGH-PRESSURE DISCHARGE LAMP LIGHTING METHOD

TECHNICAL FIELD

The present invention relates to a lighting apparatus for a high pressure discharge lamp, a high-pressure discharge lamp apparatus utilizing the same, a projector-type display apparatus utilizing the apparatus, and a lighting method for a high-pressure discharge lamp.

BACKGROUND ART

In recent years, projectors have been in common use for making presentations in meetings, conventions and so on. Also, in households, the projectors are commonly used for home theatres.

Such projectors display enlarged projections of an original image by modulating light projected from a light source, in accordance with image information provided. As a light source for such projectors, lamps with high luminance and high color rendition and which are close to a point light source are used. One example of such light source is a high-pressure mercury lamp.

In detail, such lamps have an arc tube inside in which a lighting-emitting substance, mercury of no less than 200 [mg/cm3] for example, is enclosed and a pair of tungsten electrodes are disposed substantially opposite to each other. Further, the arc tube encloses, in addition to mercury, a halogen material. The halogen material prevents tungsten composing the electrodes from diffusing and adhering to the inner wall of the arc tube and causing the wall to blacken by causing the known halogen cycle reaction during lighting, In high-pressure mercury lamps, it is important to restrain the occurrence of the so-called "arc jump" phenomenon. When the arc-jump phenomenon takes place, arc spots, the part of the electrodes from which the arc discharge in between the two electrodes originates, move in an undesired and instable manner. Since the arc jump phenomenon results in flickering on a projected image, its occurrence should be restrained to the utmost.

As a means of restraining the arc jump phenomenon described above, Patent Document 1 discloses a technique of increasing an absolute instantaneous value of an alternating current supplied to the lamp immediately before polarity reverse takes place. According to this disclosure, by locally heating the arc spot on the electrode immediately before the polarity of the electrode reverses from positive to negative, electrons will be more likely emitted from the arc spot after polarity of the electrode has reversed to negative. By repeating this process for each half-cycle period of the alternating current, the arc spot can be stabilized.

Further, Patent Document 2 suggests a technique of detecting a distance between the two electrodes and reshaping a lamp current in accordance with the distance detected. (More precisely, what is detected is a lamp voltage, which indicates the distance between the two electrodes.) In high-pressure mercury lamps, it is commonly known that protrusions at the tips of the electrodes grow and abrade (or in other words, the lamp voltage decreases and increases) depending upon the total lighting time. Patent Document 2 discloses that a continuous increase of the lamp voltage can be suppressed by applying the technique disclosed therein. The abnormal growth and abrasion of the protrusions at the tip of electrodes leave the discharge arc in an unstable state. Patent Document 2 seeks to suppress such growth and abrasion by a switching of an alternating current waveform.

CITATION LIST

Patent Document

[Patent Document 1]
Japanese Patent Application Publication No. 2004-134176
[Patent Document 2]
Japanese Patent Application Publication No. 2002-532866

SUMMARY OF INVENTION

Technical Problem

However, according to observations of the inventors of the present invention, it has been found that, when the technique disclosed in Patent Document 1 is applied, there are cases where the electrodes are damaged, due to the excessive increase in peak current and electrode temperature, particularly during a period immediately succeeding the startup of the lamp in which the lamp voltage is low (or in other words, during a period when a high current is supplied to the lamp). This damage could be avoided by diverting the technique disclosed in Citation 2. That is, by applying an alternating current with a waveform where the absolute instantaneous value increases immediately before polarity reverse if the lamp voltage is equal to or above a threshold voltage, and by applying an alternating current with a waveform where the instantaneous value does not increase immediately before polarity reverse if the lamp voltage is below the threshold voltage.

Commonly, the temperature of the electrodes disposed within a high-pressure discharge lamp is known to reach its peak around a point when control is switched from a constant current control applied for startup of the lamp to a constant power control. It is therefore desirable that the threshold voltage be set at a high value in order to avoid electrode damage immediately after the startup. However, as discussed above, since the lamp voltage during stationary lighting of the lamp is subject to change in proportion to the total lighting time of a high-pressure discharge lamp, there are cases where, depending on the total lighting time, the lamp voltage can fall below the threshold voltage even during the stationary lighting. This makes the application of the waveform where the absolute instantaneous value of the alternating current increases immediately before polarity reverse impossible.

In view of the above problems, the present invention aims to provide a high-pressure discharge lamp lighting apparatus, a high-pressure discharge lamp apparatus utilizing the same, a projector utilizing the same, and a high-pressure discharge lamp lighting method, all of which enable both the prevention of electrode damage immediately after lamp startup and the stabilization of the arc spot during the stationary lighting regardless of the total lighting time,

Solution to Problem

One aspect of the present invention is a high-pressure discharge lamp lighting apparatus that supplies an alternating current to a high-pressure discharge lamp to cause lighting, the high-pressure discharge lamp having an arc tube in which a halogen material is enclosed and a pair of electrodes is disposed, each electrode having a protrusion at a tip thereof, the high-pressure discharge lamp lighting apparatus comprising: an alternating current generation unit operable to generate an alternating current to be supplied to the high-pressure discharge lamp; and a control unit operable to control the alternating current generation unit, wherein the control unit causes the alternating current generation unit to generate an alternating current with a first waveform for a predetermined time from the beginning of lighting of the high-pressure discharge lamp and to generate an alternating current with a second waveform after elapse of the predetermined time, the alternating current with the first waveform having a lower or a same absolute instantaneous value in a final section of each half-cycle period thereof compared with the other sections, the alternating current with the second waveform having a higher absolute instantaneous value in a final section of each half-cycle period thereof than in the other sections.

Another aspect of the present invention is a high-pressure discharge lamp apparatus comprising: a high-pressure discharge lamp having an arc tube in which a halogen material is enclosed and a pair of electrodes is disposed, each electrode having a protrusion at a tip thereof, and the high-pressure discharge lamp lighting apparatus for lighting the high pressure discharge lamp.

Another aspect of the present invention is a projector comprising: the high-pressure discharge lamp apparatus.

Another aspect of the present invention is a high-pressure discharge lamp lighting method for supplying an alternating current to a high-pressure discharge lamp to cause lighting, the high-pressure discharge lamp having an arc tube in which a halogen material is enclosed and a pair of electrodes is disposed, each electrode having a protrusion at a tip thereof, the high-pressure discharge lamp lighting method comprising the steps of: (a) supplying an alternating current with a first waveform to the high-pressure discharge lamp for a predetermined time from the beginning of lighting of the lamp, the alternating current with the first waveform having a lower absolute instantaneous value in a final section of each half-cycle period thereof than in the other sections; and (b) supplying an alternating current with a second waveform to the high-pressure discharge lamp when the predetermined time has elapsed, the alternating current with the second waveform having a higher absolute instantaneous value in the final section of each half-cycle period thereof than in the other sections.

Advantageous Effects of Invention

According to the above structure, since the alternating current with the first waveform is applied for a predetermined time from the beginning of lighting of the lamp, electrode damage immediately after the startup is prevented. Similarly, since the alternating current with the second waveform is applied when the predetermined time has been reached, the stabilization of the arc spot during the stationary lighting is made possible. In result, the present invention achieves both the prevention of electrode damage and the stabilization of the arc point, even if the lamp voltage during the stationary lighting changes in proportion to the total lighting time, by switching the waveform of the alternating current in accordance with an elapsed time from the beginning of lighting of the lamp rather than according to the lamp voltage.

BRIEF DESCRIPTION OF DRAWINGS

FIG. 3 is a graph that shows the transition of lamp current, lamp power, lamp voltage, temperature of electrode, electric control, and lighting waveform, according to Embodiment 1 of the present invention.

FIGS. 4A and 4B are graphs each showing a combination of a waveform signal and a switching signal generated by a lighting waveform generator. The lighting waveform is a rectangular waveform in FIG. 4A and a staircase waveform in FIG. 4B.

DESCRIPTION OF EMBODIMENTS

The following describes preferred embodiments of the present invention, with reference to the accompanying drawings.

First Embodiment

<Structure>

Figure 1:
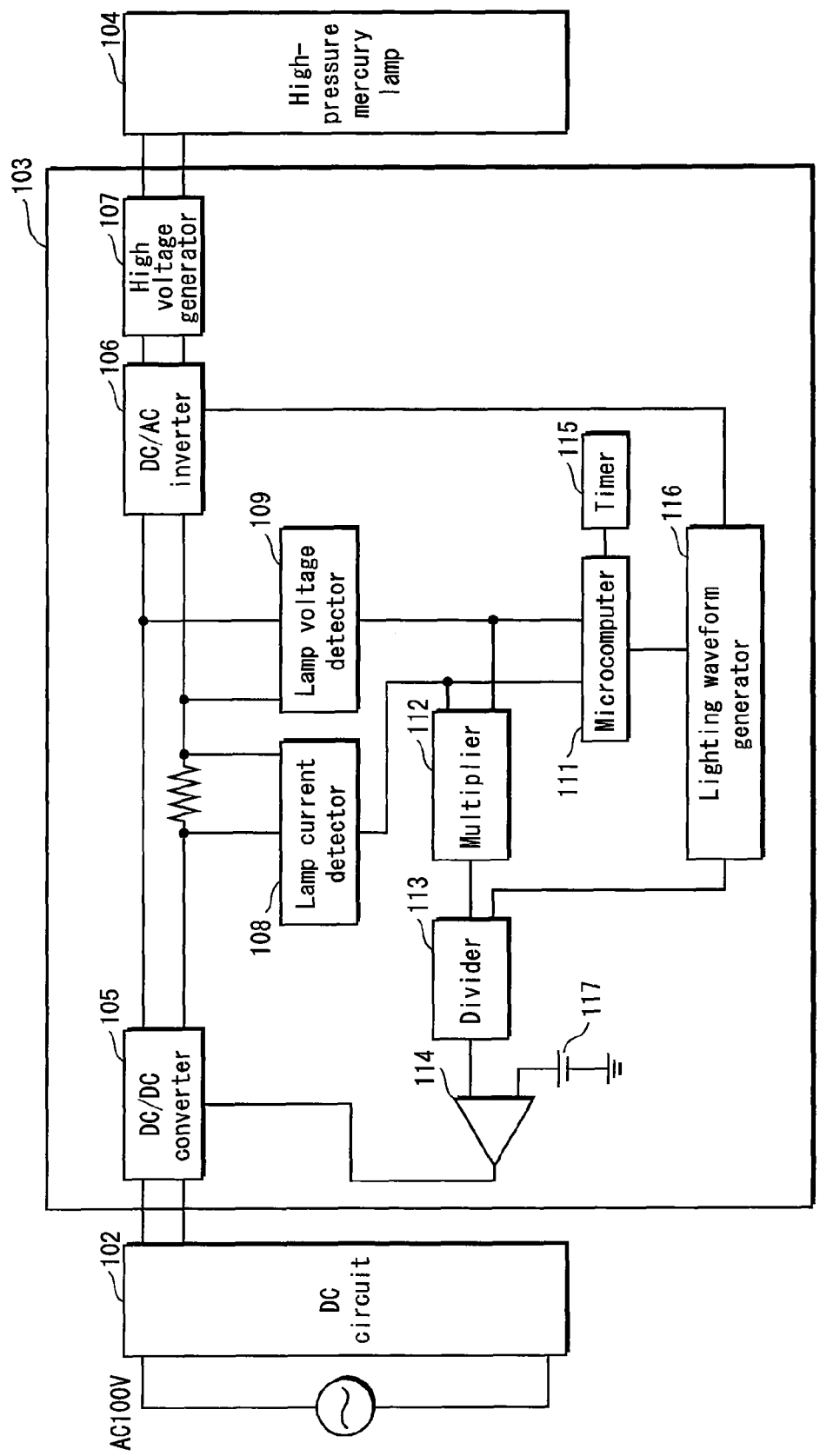
FIG. 1 is a block diagram showing the structure of a high-pressure discharge lamp apparatus according to Embodiment 1 of the present invention.

FIG. 1 is a block diagram showing a structure of a high-pressure discharge lamp apparatus in accordance with Embodiment 1 of the present invention.

As is shown in FIG. 1, a high-pressure discharge lamp apparatus 101 has a structure in which a DC circuit 102 is connected to a high-pressure discharge lamp via a high-pressure discharge lamp lighting apparatus (electric ballast) 103. The DC circuit 102 is connected to an external alternating power supply (AC 100 V). One example of a high-pressure discharge lamp is a high-pressure mercury lamp 104.

The DC circuit 102 includes, for instance, a rectifying circuit (not depicted), and generates a constant direct current from a domestic use AC voltage (100 [V]) to supply to the high-pressure discharge lamp lighting apparatus 103.

The high-pressure discharge lamp lighting apparatus 103 is mainly composed of a DC/DC converter 105, a DC/AC inverter 106, a high voltage generator 107, a lamp current detector 108, a lamp voltage detector 109, a microcomputer 111, a multiplier 112, a divider 113, a comparator 114, a timer 115, a lighting waveform generator 116, and a reference signal generator 117.

The DC/DC converter 105 includes an input terminal, an output terminal, and a control terminal. The input terminal connects to the DC circuit 102, the output terminal connects to the DC/AC inverter 106, and the control terminal connects to the comparator 114. The DC/DC converter 105 utilizes a PWM (Pulse Width Modulation) control to generate a direct current with a magnitude corresponding to the level of the signal received through the control terminal. It should be noted that, the DC/DC converter 105 carries out a constant current control, disregarding the signal received through the control terminal during the period when lamp voltage of the discharge lamp is low, or in other words, the period when a high current is supplied to the lamp between startup and warm up. Here, "Constant Current Control" not only indicates a type of control for keeping the current level constant, but more generally refers to a type of control for limiting the current level to a certain level so as to prevent the lamp from being exposed to overcurrent during the low voltage period before the warm up. Therefore, cases where the lamp current is not stable are included therein.

The DC/AC inverter 106 includes an input terminal, an output terminal, and a control terminal. The input terminal connects to DC/DC converter 105. The output terminal connects to the high-pressure mercury lamp 104 via the high voltage generator 107. The control terminal connects to the lighting waveform generator 116. The DC/AC inverter 106 generates an alternating current having a frequency in proportion to a switching signal frequency received through the control terminal.

The high voltage generator 107 includes, for instance, a power transformer (not depicted). The high voltage generator 107 generates a high voltage and applies the same to the high-pressure mercury lamp 104, thus inducing a dielectrical breakdown between a pair of electrodes 19 enclosed in the lamp and causing the lamp to start up.

The lamp current detector 108 detects a current running through a wiring connecting the DC/DC converter 105 and the DC/AC inverter 106 (equivalent to the lamp current), and outputs a current signal indicating the level of the lamp current.

The lamp voltage detector 109 detects the output voltage from the DC/DC converter 105 (equivalent to the lamp voltage), and outputs a voltage signal indicating the level of the lamp voltage.

The microcomputer 111 controls the timer 115 and the lighting waveform generator 116 in response to the current and voltage signals mentioned above. Details of the control are to be mentioned below.

The multiplier 112 outputs an electric power signal which is obtained by multiplying the current signal and the voltage signal. The resulting electric power signal indicates the level of electric power being supplied to the high-pressure mercury lamp 104.

The divider 113 generates a ratio signal, which is obtained by dividing the current signal input and the waveform signal input. The waveform signal indicates the desired electric power waveform (since a high-pressure mercury lamp has a constant voltage characteristic, this waveform is equivalent to the desired current waveform), and is supplied from lighting waveform generator 116.

The comparator 114 generates a differential signal, which is obtained by carrying out a subtraction between the ratio signal and the reference signal. The reference signal is a signal indicating the desired electric power value, and is supplied from the reference signal generator 117.

The timer 115 measures the elapsed time since beginning of lighting of the high-pressure mercury lamp 104.

The lighting waveform generator 116 generates a waveform signal and a switching signal in response to the control signal supplied from the microcomputer 111. The control signal contains, for instance, information which specifies either one of a rectangular waveform and a staircase waveform, and information which specifies the lighting frequency to be applied. As is mentioned above, the waveform signal is a signal indicating the desired power signal and the switching signal is a signal determining the frequency of the alternating current generated by the DC/AC inverter 106.

Accordingly, the DC/DC converter 105, the DC/AC inverter 106, and the high voltage generator 107, together, function as an alternating current generation unit. The lamp current detector 108, the lamp voltage detector 109, the microcomputer 111, the multiplier 112, the divider 113, the comparator 114, the timer 115, the lighting waveform generator 116, and the reference signal generator 117, together, compose a control unit. The microcomputer 111 functions as a selector for selecting either the rectangular waveform or the staircase waveform as the lighting waveform.

Next, referring to FIG. 2, the schematic structure of the high-pressure mercury lamp 104 with a 180 [W] rated power will be explained as one example.

Figure 2:
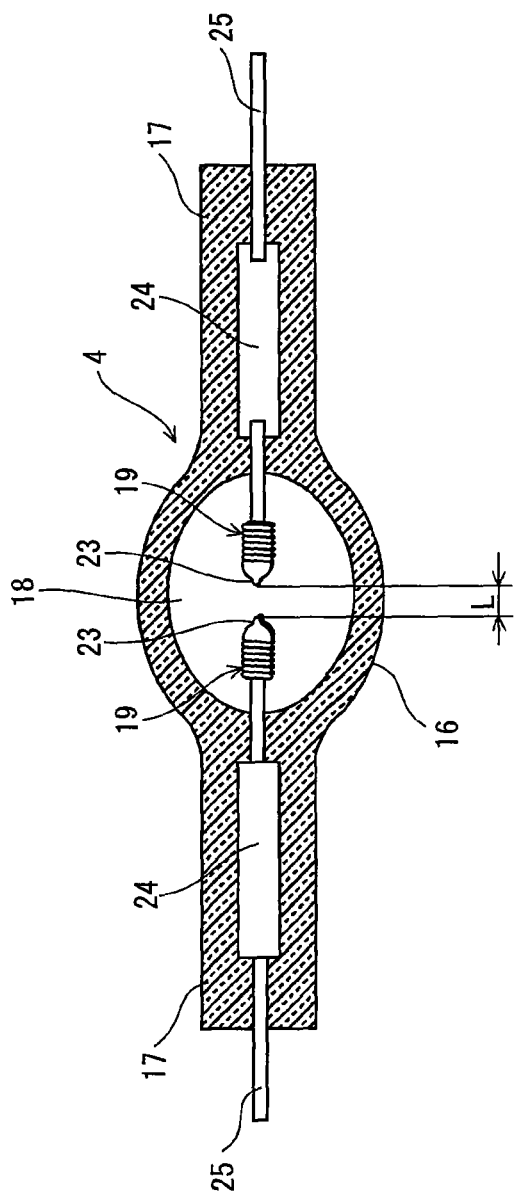
FIG. 2 shows the structure of a high-pressure mercury lamp.

As is shown in FIG. 2, an arc tube of the high-pressure mercury lamp 104 includes a spheroid-shaped light emitting part 16 at a center thereof and substantially cylindrical sealing parts 17 adjacent to the light emitting part. The vessel of the arc tube is composed of quartz glass, for example. The sealing parts 17 extend outwards from each side of the light emitting part.

The light emitting part 16 has therein, an internal space (discharge space 18). The internal space encloses mercury (Hg) which is the light emitting material, a rare gas such as Argon (Ar), Krypton (Kr), Xenon (Xe), or a mixture gas of more than two or more of these which is used for aiding startup, and a halogen material such as Iodine (I), Bromine (Br), or a mixture of these which is used for the so-called halogen cycle. Each of the substances enclosed have a predetermined amount. For example, the amount of mercury enclosed is set to be in a range from 150 [mg/cm$^3$] to 390 [mg/cm$^3$] inclusive, the amount of Argon gas enclosed (at 25° C.) is set to be in a range from 0.01 [MPa] to 1 [MPa] inclusive, and the amount of Bromine enclosed is set to be in a range from $1\times10^{-10}$ [mol/cm$^3$] to $1\times10^{-4}$ [mol/cm$^3$] inclusive, preferably, $1\times10^{-9}$ [mol/cm$^3$] to $1\times10^{-5}$ [mol/cm$^3$] inclusive.

Further, inside the light emitting part 16, a pair of tungsten (W) electrodes 19 is disposed in such a manner that the respective tips of the pair of electrodes substantially opposite each other. As an example, the gap between the electrodes 19, which is the electrode gap L, is set in a range from 0.5 [mm] to 2.0 [mm] inclusive.

Each of the electrodes 19 includes an electrode rod and an electrode coil attached to one end thereof. In particular, this end of each of the electrodes 19 is processed to have, for example, a substantially semi-spherical, spherical or circular-cone shape, by integrally melting a part of the electrode rod and a part of the electrode coil. At the very tips of the electrodes 19, protrusions 23 formed by the accumulation of tungsten are self formed without being applied any mechanical processing. That is, during the lighting of the lamp, the tungsten composing the electrodes 19 evaporates, and then returns to and accumulates at the very tips thereof due to the halogen cycle reaction. The protrusions 23 described herein are originally formed during a lighting process in a manufacturing process and therefore already formed at the completion of manufacture. The distance L, defined as the distance between the electrodes 19 above, therefore stands for, in particular, the distance between the protrusions 23.

Furthermore, the method applied in the forming of the substantially semi-spherical, spherical, or circular cone shapes and the like at the ends of electrodes 19 is not limited to integrally melting a part of the electrode rods and a part of electrode coils as mentioned above. It may also be conceived to attach parts which are shaped and cut away in the shape of substantial semi-spheres, spheres, or a circular cone, or are sintered in such shapes, to the ends of the electrodes 19 in advance.

The other end of each of the electrodes 19 is connected to one end portion of an external lead 25, via a molybdenum foil hermetically heat-sealed to the sealing parts 17. The other end portion of the external lead 25 protrudes externally from one end surface of the sealing parts 17, connecting to such external objects as a power supply line or a base, which are not depicted in FIG. 2.

FIG. 3 is a graph that shows the transition of lamp current, lamp power, lamp voltage, temperature of electrode, electric control, and lighting waveform according to Embodiment 1 of the present invention.

The high-pressure discharge lamp lighting apparatus 103 conducts the constant current control (set at a constant current of 3 [A] for example) from 2 [s] after the beginning of lighting of the lamp and until when the lamp voltage reaches a predetermined level (for instance, 60 [V]) due to the rise in the lamp voltage caused by the evaporation of mercury enclosed therein. When the lamp voltage reaches the predetermined level (for instance, 60 [V]), the high-pressure discharge lamp apparatus 103 switches to a constant power control where the lamp power is stable (180 [W]).

In addition, the high-pressure lamp lighting apparatus 103 is supplied with an alternating current with a rectangular lighting waveform for a predetermined time (100 [s] for example) from the beginning of lighting of the lamp, and is supplied with an alternating current with a staircase waveform when the predetermined time has been reached.

Electrode temperature, which cannot be measured directly, is calculated by measuring a spectrum intensity of a particular frequency and converting the results to temperature. As shown in FIG. 3, the electrode temperature of the high-pressure mercury lamp 104 reaches the peak around the point when the control switches from the constant current control to the constant power control (within an error range of a few seconds).

Figure 5A:
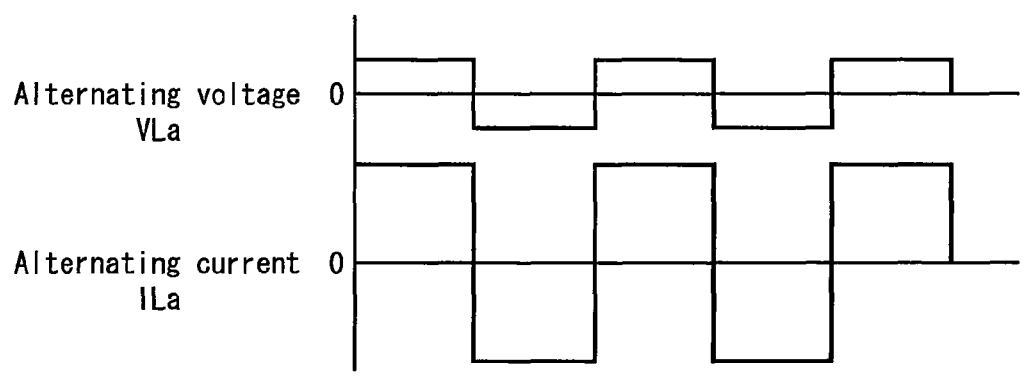
FIGS. 5A and 5B are graphs each showing a combination of lamp voltage and lamp current of a high-pressure mercury lamp when a DC/DC converter and a DC/AC inverter are controlled based on the signals illustrated in FIGS. 4A and 4B. The lighting waveform is a rectangular waveform in FIG. 5A and a staircase waveform in FIG. 5B.
Figure 5B:
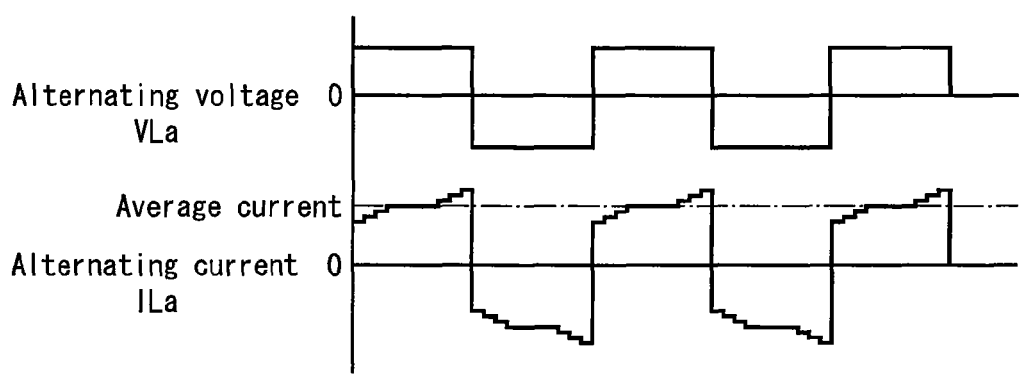

FIGS. 4A and 4B are graphs showing the waveform signal and switching signal generated by the lighting waveform generator. The lighting waveform supplied is a rectangular waveform in FIG. 4A, whereas the lighting waveform supplied is a staircase waveform in FIG. 4B. FIGS. 5A and 5B are graphs showing the lamp voltage and lamp current of a high-pressure mercury lamp when the DC/DC converter and the AC/DC inverter are controlled applying the waveforms illustrated in FIGS. 4A and 4B. The lighting waveform supplied is a rectangular waveform in FIG. 5A, whereas the lighting waveform supplied is a staircase waveform in FIG. 5B.

The waveform signal is supplied as a signal indicative of the desired power waveform to the DC/DC converter 105 via the divider 113 and the comparator 114. On the other hand, the switching signal is sent to the DC/AC inverter 106, as a signal determining the lighting waveform. The DC/AC inverter 106 sends a lamp current in the positive direction while the switching signal received is high level, and to the contrary, sends a lamp current in the reverse direction while the switching signal received is low level.

Accordingly, in the case of the waveform signal shown in FIG. 4A, the lamp current has a rectangular waveform and the instantaneous value of the alternating current is substantially constant during each half-cycle period thereof as is shown in FIG. 5A. The expression "substantially constant" herein is used with the intention of including the cases of overshoot and undershoot.

On the other hand, in the case of the waveform signal shown in FIG. 4B, the lamp current has a staircase waveform. The absolute instantaneous value of the alternating current gradually increases in a staircase-like manner in an initial section of each half-cycle period thereof, is maintained at its initial value in the intermediate section thereof, and increases gradually again in the final section thereof, as shown in FIG. 5B.

<Operations>

Now, description will be made on an example of the operation of the high-pressure discharge lamp apparatus 103, in accordance to Embodiment 1 of the present invention.

Figure 6:
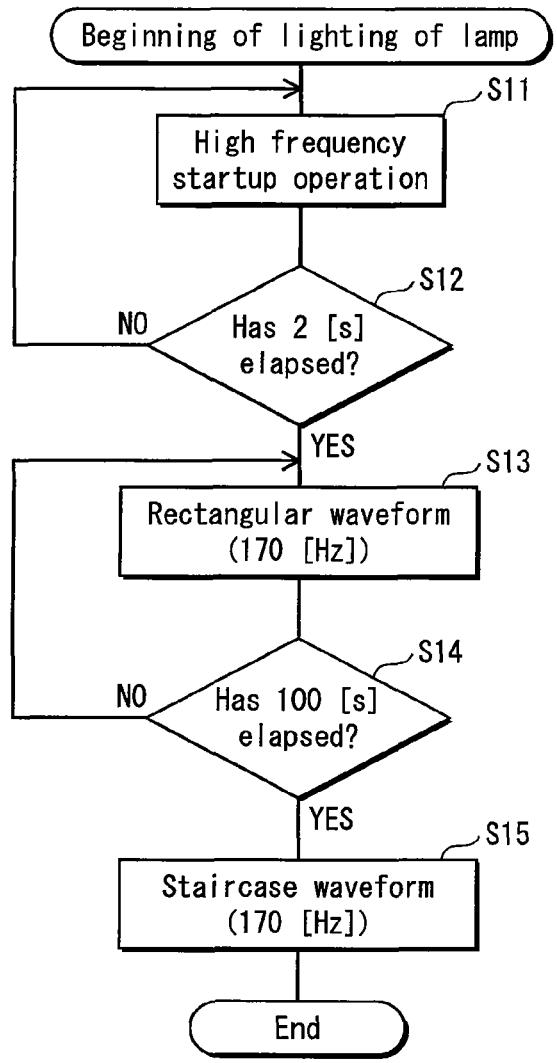
FIG. 6 is a flowchart showing the operations of a high-pressure discharge lamp lighting apparatus according to Embodiment 1 of the present invention.

FIG. 6 is a flowchart showing the operation of the high-pressure discharge lamp apparatus 103, in accordance with Embodiment 1 of the present invention.

(1) Firstly, when a lighting switch (not depicted) for causing the high-pressure mercury lamp 104 to start discharging is switched on, the microcomputer 111 causes the high voltage generator 107 to generate a voltage with a high frequency, for example a 3 [kV] voltage with a 100 [kHz] frequency. The generated voltage with the high frequency is applied to the high-pressure mercury lamp 104.

(2) When dielectric breakdown takes place between the two electrodes 19 in the high-pressure mercury lamp 104, an arc discharge current begins to flow therebetween. In other words, the high-pressure mercury lamp 104 starts discharge. The voltage with the high frequency is continuously applied to the high-pressure mercury lamp 104 for a predetermined time following the beginning of the discharge.

When the microcomputer 111 detects the lighting of the lamp from the current value signal, the timer 115 is caused to operate. Then the microcomputer 111 causes the lighting waveform generator 116 to generate a high frequency switching signal, the frequency of which is selected within the range of 10 [kHz] to 500 [kHz] inclusive, until when timer 115 indicates the termination of the warm up period (a duration of 2 [s] for example). When the 2-second warm up period has passed over, a so-called startup operation is completed. (Step S12: YES)

It should be noted that, in the above startup operation, the output from the high voltage generator 107 applied to start the discharge of the high-pressure mercury lamp 104 is not limited to a high voltage with a high frequency. Alternatively, a well-known intermittent oscillation high voltage pulse may be applied. Similarly, the method applied to stabilize the arc discharge after the start of the discharge is not limited to the operation of high frequency as stated herein. Alternatively, a well-known direct current operation or a constant current control with a low frequency current with a frequency of under 20 [Hz] may be applied.

(3) After the startup operation, the microcomputer 111 supplies a control signal A to the lighting waveform generator 116. The control signal A includes information which specifies a rectangular waveform and information which specifies a frequency A (170 [Hz] for example). Thus, a rectangular waveform alternating current with a frequency of 170 [Hz] is supplied to the high pressure mercury lamp 104 (Step S13). In addition, the frequency A is to be selected in advance from the range of 40 [Hz] to 700 [Hz] inclusive.

(4) The microcomputer 111 continuously supplies the control signal A until the elapsed time indicated by the timer 115 reaches a predetermined time (100 [s] for example) (Step S14: NO), and when the predetermined time has been reached, the microcomputer 111 then switches to supplying a control signal B. The control signal B includes information which specifies a staircase waveform and information which specifies a frequency B (170 [Hz] for example). Thus, a staircase waveform alternating current with a frequency of 170 [Hz] is supplied to the high pressure mercury lamp 104 (Step S15). The Frequency B is to be selected in advance from the range of 20 [Hz] to 1000 [Hz] inclusive. Although frequency A and frequency B both have the same frequency of 170 [Hz] in the above example, this is not a limited condition and frequency A and B may each be given different values.

(5) This condition is maintained subsequently until when the lamp is turned off (lighting switch OFF), Since the high-pressure discharge lamp apparatus 101 according to Embodiment 1 of the present invention includes a high-pressure discharge lamp lighting apparatus 103 with the above described characteristics, it has the following advantages.

The high-pressure discharge lamp apparatus 101 avoids electrode damage occurring immediately after the beginning of lighting of the high-pressure discharge lamp, applying an alternating current with a rectangular waveform thereto for a predetermined time from the beginning of lighting. Similarly, the high-pressure discharge lamp apparatus 101 keeps the arc spot at a stable state during the stationary lighting, applying an alternating current with a staircase waveform after the predetermined time has been reached. This further leads to the restraining of the decrease of emitted light from a reflecting mirror, which is caused by the arc spot being displaced from its initial location.

It is preferable to set the above predetermined time so that it is longer than a time period that begins at the beginning of the lighting and ends when the temperature of the electrodes reaches the peak. More specifically, it is preferable that the predetermined time be in a range from 30 [s] to 300 [s] inclusive. If the predetermined time is shorter than 30 [s], there is a possibility that electrode damage cannot be avoided, since the warm up of the lamp has not yet been completed at that point. Also, if the predetermined time is longer than 300 [s], there is a possibility that flickering occurs, since the lamp will already be in the stationary lighting state by then.

Second Embodiment

The following describes the high-pressure discharge lamp apparatus 101 in accordance with Embodiment 2 of the present invention. In Embodiment 2 of the present invention, when the lamp voltage of a high-pressure mercury lamp 104 falls below a predetermined value during the stationary lighting, a lighting frequency is switched. The other aspects of the embodiment are the same as those in Embodiment 1. Thus they will not be described further in detail hereinafter.

<Operations>

Figure 7:
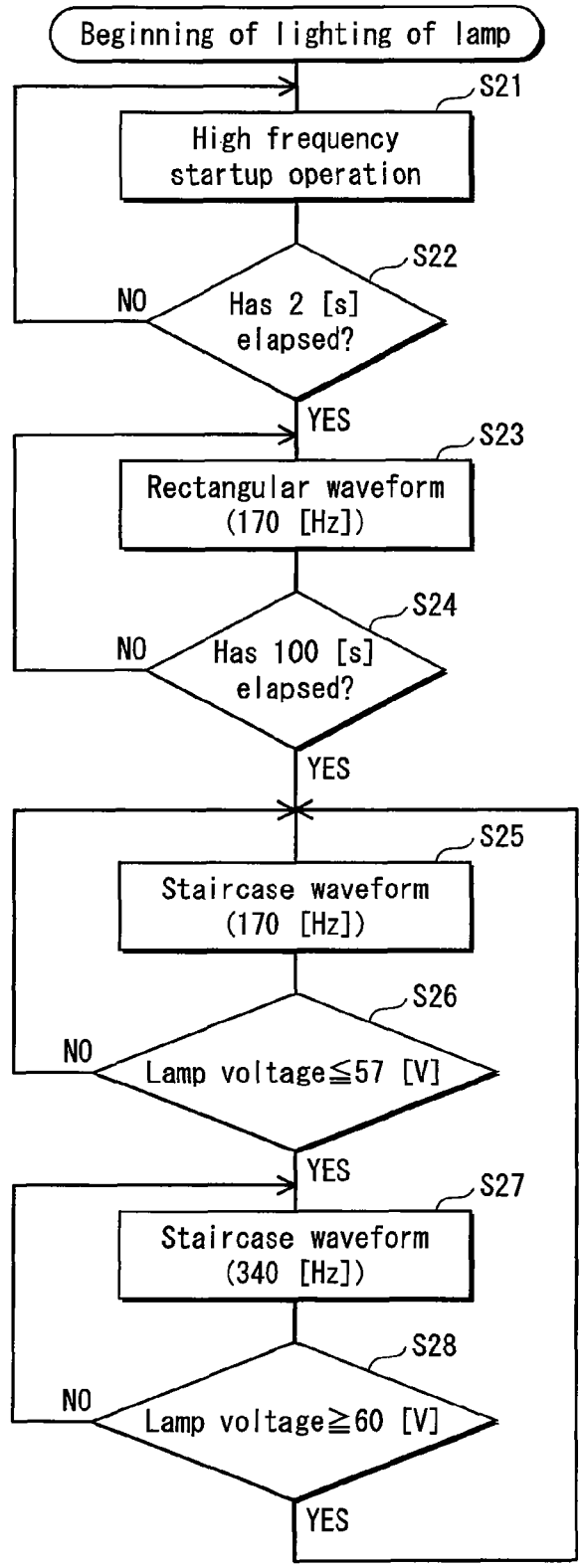
FIG. 7 is a flowchart showing the operations of a high-pressure discharge lamp lighting apparatus according to Embodiment 2 of the present invention.

FIG. 7 is a flowchart showing the operations of the high-pressure discharge lamp lighting apparatus in accordance with Embodiment 2 of the present invention.

Operations carried out during the 100 [s] from the beginning of lighting of the lamp (Steps S21-S24) are the same as those in Embodiment 1 (Steps S11-S14).

The microcomputer 111 supplies the control signal B to the lighting waveform generator 116 when the elapsed time measured by the timer 115 reaches a predetermined time (100 [s] for example) (Step S24: YES). The control signal B includes information which specifies the staircase waveform and information which specifies the frequency B (170 [Hz] for example). Thus, a staircase waveform alternating current with a frequency of 170 [Hz] is supplied to the high pressure mercury lamp 104 (Step S25).

The microcomputer 111 continuously supplies the control signal B unless the lamp voltage indicated by a voltage signal falls below a predetermined value (57 [V] for example) (Step S26: YES), and if the lamp voltage falls below the predetermined value (57 [V] for example) (Step S 26: YES), the microcomputer 111 switches to supplying a control signal C. The control signal C includes information which specifies the staircase waveform and information which specifies a frequency C (340 [Hz] for example). Thus a staircase waveform alternating current with a frequency of 340 [Hz] is supplied to the high pressure mercury lamp 104 (Step S27). In addition, the frequency C is to be selected in advance from the range of 300 [Hz] to 1000 [Hz] inclusive, so that it is higher than the frequency B (170 [Hz] for example).

The microcomputer 111 continuously supplies the control signal C, unless the lamp voltage indicated by the voltage signal exceeds a predetermined value (60 [V] for example) (Step S28: NO), and if the lamp voltage exceeds the predetermined value (60 [V], for example) (Step 28: YES), the microcomputer 111 switches to supplying the control signal B.

Further, the condition applied in switching the frequency of an alternating current to the frequency C which is selected from the range of 300 [Hz] to 1000 [Hz] inclusive is based on the lamp voltage of the high-pressure mercury lamp 104, but the lamp voltage is not limited to 57 [V], and similarly, the condition applied in switching to the frequency B thereafter is not limited to 60 [V]. Such conditions may be set as appropriate depending upon the specifications of the high-pressure discharge lamp 104, including rated power and the like. Similarly, although a 3 [V] hysteresis is applied in setting the lamp voltage to 57 [V] and 60 [V] in this embodiment, the hysteresis value may be set as appropriate as well.

Embodiment 2 of the present invention produces the following advantages in addition to those described in Embodiment 1.

During an initial stage of the total lighting time of the high-pressure discharge lamp 104 (within 500 hours inclusive for example), the so-called halogen cycle is active. In this stage, the electrode gap distance L can fall below the desired range due to the excessive growth of the protrusions 23 of the electrodes 19 in such cases as where the ambient temperature of the high-pressure mercury lamp fluctuates due to some changes in environment. This leads to a low voltage state of the high-pressure discharge lamp 104 in which the lamp voltage falls below the desired value frequently or for a long period of time.

Accordingly, the alternating current with the frequency C (340 [Hz] for example) selected from the range of 300 [Hz] to 1000 [Hz] inclusive is to be supplied when the high-pressure mercury lamp 104 falls into such low voltage stage as where the lamp voltage falls below the predetermined value (57 [V] for example). This restrains the growth of the protrusions 23 of the electrodes 19.

Further, although 340 [Hz] is adopted as the frequency C of the alternating current, this value is determined based on the specifications of the high-pressure mercury lamp 104 and therefore is a value derived through experimentation. Similar advantages as those set forth above are obtained by selecting a value which is in the range between the above derived value and 1000 [Hz] inclusive. The range of frequency appropriate for the frequency C is 300 [Hz] to 1000 [Hz] inclusive, when considering the specifications of the high-pressure mercury lamp 104 as described in Embodiment 1 in scope of the present invention.

Third Embodiment

Now, description will be made on the high-pressure discharge lamp apparatus 101 in accordance to Embodiment 3 of the present invention. In Embodiment 3 of the present invention, a lighting frequency is switched around the point when a predetermined time (100 [s] for example) has elapsed since the beginning of lighting of the lamp. Since the other aspects of the embodiment are the same as those in Embodiment 2, they will not be described further in detail hereinafter.

<Operations>

Figure 8:
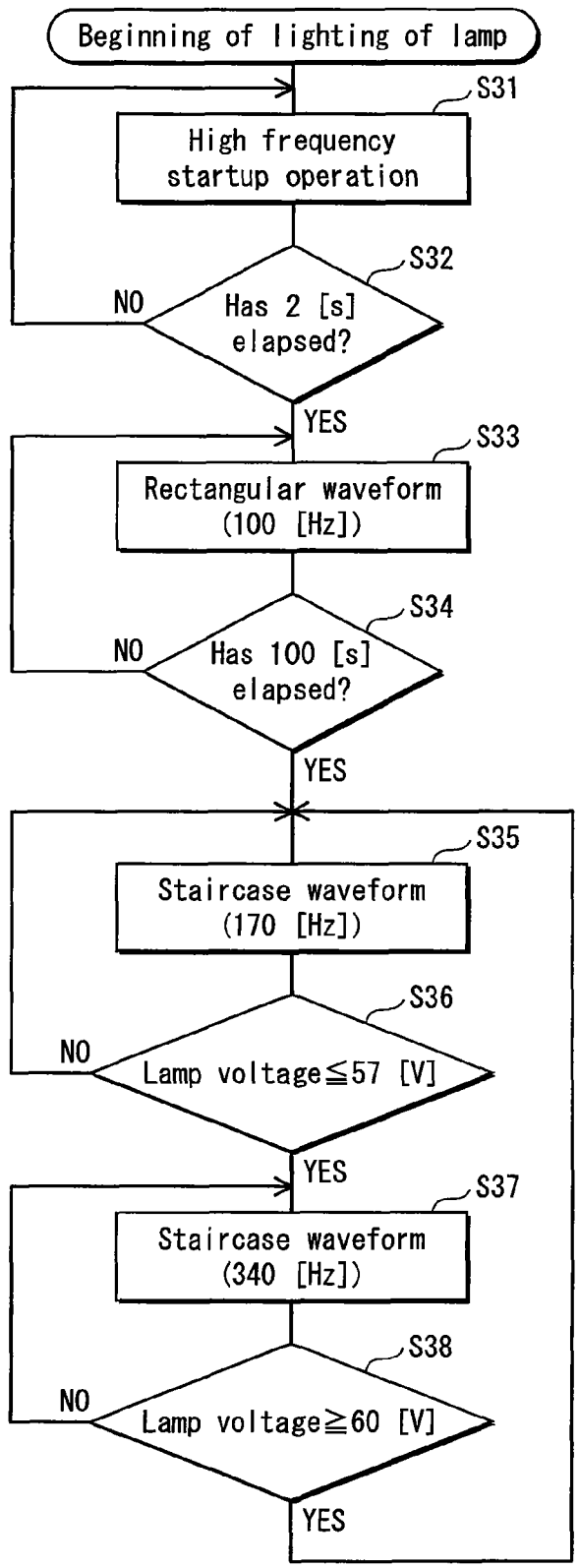
FIG. 8 is a flowchart showing the operations of a high-pressure discharge lamp lighting apparatus according to Embodiment 3 of the present invention.

FIG. 8 is a flowchart showing the operations of the high-pressure discharge lamp lighting apparatus in accordance with Embodiment 3 of the present invention.

The startup operations of the lamp (Steps S31, S32) are the same as those in Embodiment 2 (Steps S21, S22).

Following the startup operations, the microcomputer 111 supplies a control signal D to the lighting waveform generator 116. The control signal D includes information which specifies a rectangular wave and information which specifies a frequency D (100 [Hz] for example). Thus, a rectangular waveform alternating current with a frequency of 100 [Hz] is supplied to the high-pressure mercury lamp 104 (Step S33). In addition, the frequency D is selected in advance from the range of 50 [Hz] to 200 [Hz] inclusive.

The microcomputer 111 continuously supplies the control signal D until the time indicated by the timer 115 reaches a predetermined time (100 [s] for example) (Step S34: NO), and when the predetermined time has been reached, it switches to the supplying of the control signal B (Step S34: YES).

The operations following this point (Steps S35-S38) are the same as those in Embodiment 2 of the present invention.

In the present embodiment, it is preferable that the frequency D of the alternating current be selected from a range of 50 [Hz]-200 [Hz] inclusive in order to restrain the generation of noise and to prevent the protrusions 23 from deforming or evaporating/disappearing. The level of audible intensity can be determined by referring to the standardized indicators provided in the equal loudness contour, ISO226 and the like. The inventors of the present invention have found out that it is preferable that the frequency D be set below 200 [Hz] inclusive upon referring to such indicators and through actually carrying out assessments with subjects. According to the equal loudness contour, the lower the frequency of the frequency D is set, the lower the audible intensity is, but at the same time, the lamp current value is higher during the constant current control following the startup than during the constant power control, resulting in the excessive rise in temperature of the electrodes 19. If the constant frequency is set to an excessively low level under such conditions, the temperature of the electrodes 19 could rise excessively, resulting in the deforming or evaporating/disappearing of the protrusions 23. As a means to securely prevent the excessive rise in temperature of the electrodes 19 and accordingly the deforming or evaporating/disappearing of the protrusions 23 brought about thereby, the frequency D should be set above 50 [Hz] preferably for a predetermined time from the beginning of lighting of the lamp.

Embodiment 3 of the present invention produces the following advantages in addition to those of Embodiment 2.

In this embodiment, the application of the frequency C (340 [Hz] for example) which has a high audible intensity for the lighting of the lamp is disabled for a predetermined time from the beginning of lighting of the lamp, which makes it possible to restrain the occurrence of offensive noises.

Fourth Embodiment

Now, description will be made on Embodiment 4 of the present invention which is in the form of a projector, referring to FIGS. 9 through 11.

Figure 9:
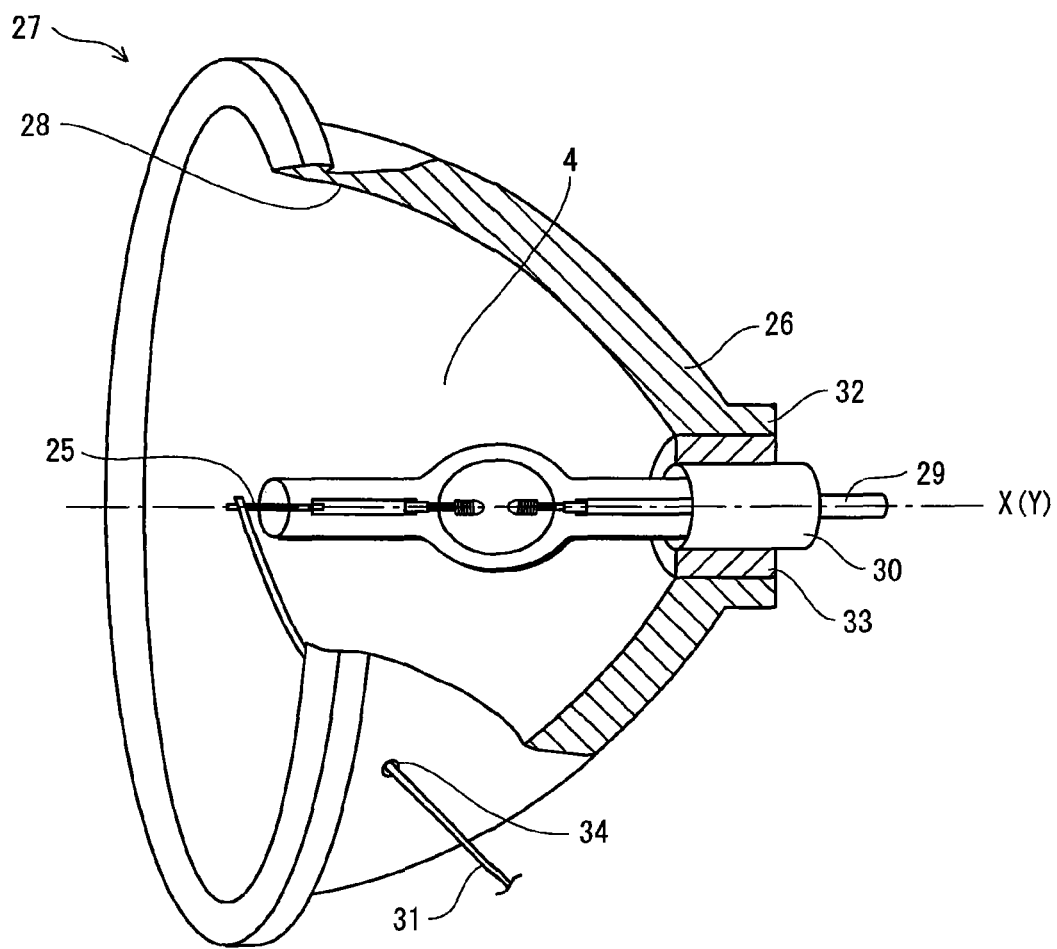
FIG. 9 is a partially cutout perspective view schematically showing the structure of a lamp unit.

The high-pressure mercury lamp 104 is incorporated into a reflecting mirror 26 to compose a lamp unit 27, as is shown in FIG. 9.

In other words, the lamp unit 27, as is shown in FIG. 9, includes the high-pressure mercury lamp 104 and the reflecting mirror 26. The reflecting mirror 26 has a glass or metal substrate provided with a reflective surface 28 with a concave inner surface and has the high-pressure mercury lamp 104 fitted within it. The high-pressure discharge lamp 104 is fitted into the reflecting mirror 26 in such a manner that a longitudinal central axis X of the high-pressure mercury lamp 104 and an optical axis Y of the reflecting mirror 26 are substantially aligned, and light emitted from the high-pressure mercury lamp 104 is reflected by the reflective surface 28.

A cylindrical base 30 which is provided with a power supply terminal 29 is attached to one of the sealing parts 17 of the high-pressure mercury discharge lamp 104. One end of the external lead 25 protrudes from one end surface of the sealing part 17 and is connected to the power supply connection terminal 29. The other end of the external lead 25 is connected to a power supply line 31.

The base 30 attached to the high-pressure mercury lamp 104 is inserted in a neck part 32 of the reflecting mirror 26 and fixed thereto by means of an adhesive 33. Here, the power supply line 31 is passed through a through-hole 34 pierced through the reflecting mirror 26.

In addition, the reflecting mirror 28 is formed by, for example a spheroidal surface or a paraboloid of revolution, and has a film of material, such as a multilayer interference film, deposited thereto.

Figure 10:
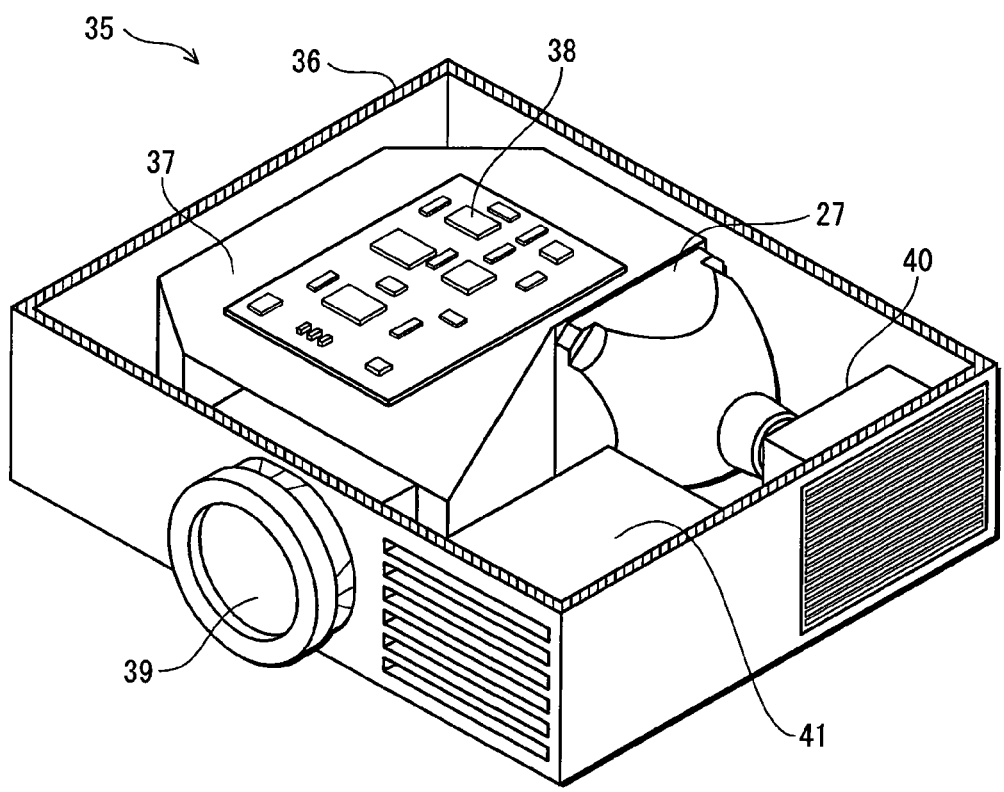
FIG. 10 is a partially cutout perspective view schematically showing the structure of a front projector.

FIG. 10 shows a schematic structure of a front projector 35. The front projector 35 is a front type projector that projects an image towards a screen (not depicted) set in front thereof. In addition, in FIG. 10, a top panel of a later-described outer case 36 is omitted.

The front projector 35 includes, the lamp unit 27 as a light source, an optical unit 37, a control unit 38, a projection lens 39, a cooling fan unit 40, and a power supply unit 41, all of which are housed in an outer case 36. The optical unit 37 includes an image formation unit which forms an image by modulating incoming light and an illumination unit which projects illuminative light from lamp unit 27 to the image formation unit (both of which are not depicted). The illumination unit includes a color wheel (not depicted) which is formed by color filters of three colors, and splits the illumination light into three colors of R, G, B, which are projected to the image formation unit. The control unit 38 controls such units as the image formation unit. The projection lens 39 projects enlarged optical images modulated and formed by the image formation unit. The power supply unit 41 includes the high-pressure discharge lamp lighting apparatus 103 and converts a power from a commercial power supply to a power type suitable for the control unit 38 and the lamp unit 27 and supplies it thereto.

Figure 11:
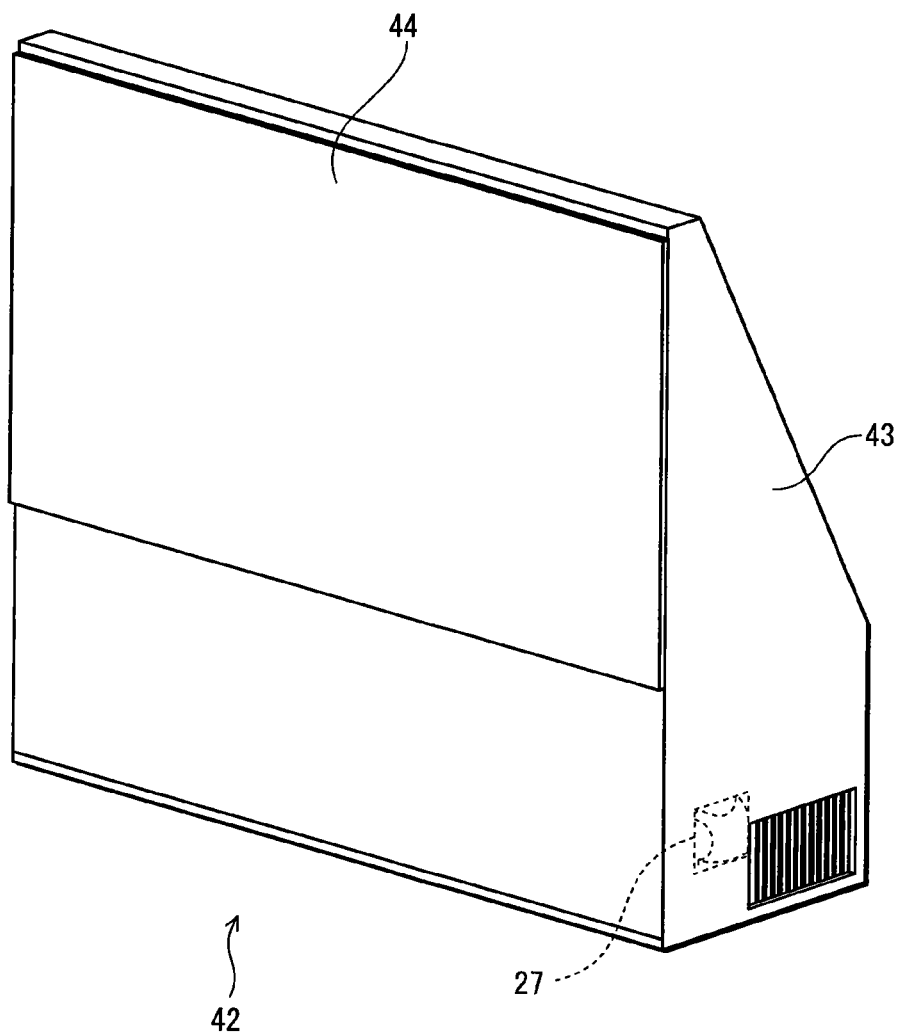
FIG. 11 is a perspective view schematically showing the structure of a rear projector.
Figure 12A:
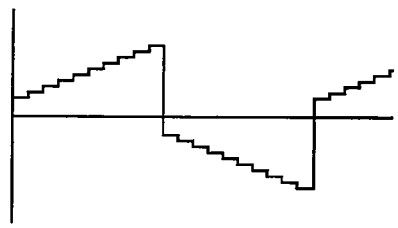
FIG. 12 is a graph showing examples of modifications of alternating current waveforms.
Figure 12B:
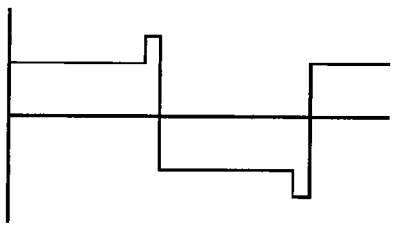
Figure 12C:
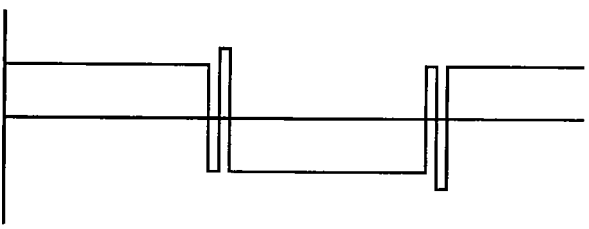
Figure 12D:
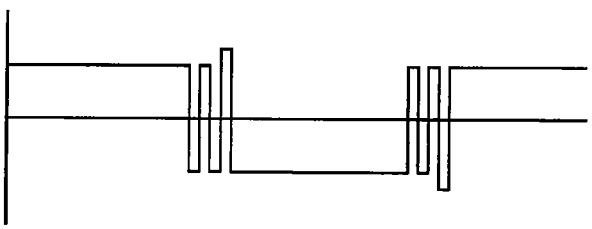

FIG. 11 shows a schematic structure of a rear projector 42. The rear projector 42 includes the lamp unit 27, an optical unit, a projection lens, a mirror, and a high-pressure discharge lamp lighting apparatus and others (all of which are not depicted) housed in an outer case 43. Images projected from the projection lens and reflected by the mirror are projected from behind a transparent screen 44, thereby displaying the image.

In the above, description has been made on the high-pressure discharge lamp lighting apparatus and others according to the present invention in accordance with the Embodiments, but the present invention is not limited to the Embodiments introduced herein. Below are some examples of modifications which may be conceived.

<Modifications>

(1) In the Embodiments, a staircase waveform depicted in FIG. 5(*b*) is adopted as a lighting waveform applied to restrain arc jump. However, the present invention is not limited to this. As a means of restraining the arc jump, an alternating current with a waveform which has a higher absolute instantaneous value during the final section of each half-cycle period than during the other sections within each half-cycle period may be used in general. Therefore, the waveform may be one where the absolute instantaneous value of the alternating current gradually increases at a predetermined rate as is shown in FIG. 12(*a*), or a one where the instantaneous value of the alternating current is substantially constant during all other sections of each half-cycle period besides the final section where the absolute instantaneous value increases, as is shown in FIG. 12(*b*). Further, the waveform may be a one in which polarity reverse takes place during a section immediately preceding the final section as is shown in FIG. 12(*c*), or a one where polarity reverse takes place in two sections preceding the final section, or a one where polarity reverse takes place in three or more sections, FIG. 12(*d*). Such waveforms are modified waveforms, formed by superposing a different high frequency wave to each half-cycle period of a fundamental waveform with a lower frequency. Here, a "half-cycle period" in such modulated waveforms is considered to be equivalent to a half-cycle period of a waveform which can be considered as the fundamental waveform.

(2) In the Embodiments, a rectangular waveform as shown in FIG. 5(*a*) is adopted as a lighting waveform for the prevention of electrode damage. However, the present invention is not limited to this, and the same advantages may be obtained by ascertaining that an absolute instantaneous value of an alternating current during a final section of each half-cycle period is lower than or the same as during the other sections within each half-cycle period. It should be noted, however, that the advantages of the present invention are not affected substantially in cases where the absolute instantaneous value of the alternating current in the final section of each half-cycle period is slightly higher (by about 5% for example) than that in the other sections due to distortion of the waveform and other influences, or where the value is higher for a very short amount of time (for about 1 [s] for example) for a predetermined time from the beginning of lighting of the lamp. Therefore, even the cases above may be regarded as being within the technical scope of the present invention, which recites, "the absolute instantaneous value of an alternating current during the final section of each half-cycle period is lower than or the same as during the other sections within each half-cycle period".

(3) In Embodiment 2 of the present invention, it is specified that the switching of lighting frequency in accordance with the lamp voltage (S25-S28) is not performed until a predetermined time has been reached, but the present invention is not limited to this, and, for example, the apparatus may be designed to perform the switching of lighting frequency in accordance with the lamp voltage after the beginning of lighting of the lamp.

INDUSTRIAL APPLICABILITY

An apparatus of the present invention can be used in a wide range of applications including projectors.

REFERENCE SIGNS LIST

16 light emitting part
17 sealing parts
18 discharge space
19 electrodes
23 protruding part
24 metal foil
25 exterior lead wire
26 reflecting mirror
27 lamp unit
28 reflecting surface
29 power supply connecting terminal
30 base
31 power cable
32 neck part
33 adhesive
34 through hole
35 front projector
36 housing
37 optical unit
38 control unit
39 projection lens
40 cooling fan unit
41 power supply unit
42 rear projector
43 housing
44 transparent screen
101 high-pressure discharge lamp apparatus
102 DC circuit
103 high-pressure discharge lamp lighting apparatus
104 high-pressure mercury lamp
105 DC/DC converter
106 DC/AC inverter
107 high voltage generator
108 lamp current detector
109 lamp voltage detector
111 microcomputer
112 multiplier
113 divider
114 comparator
115 timer
116 lighting waveform generator
117 reference signal generator

The invention claimed is:

1. A high-pressure discharge lamp lighting apparatus that supplies an alternating current to a high-pressure discharge lamp to cause lighting, the high-pressure discharge lamp having an arc tube in which a halogen material is enclosed and a pair of electrodes is disposed, each electrode having a protrusion at a tip thereof, the high-pressure discharge lamp lighting apparatus comprising:

an alternating current generation unit operable to generate an alternating current to be supplied to the high-pressure discharge lamp; and a control unit operable to control the alternating current generation unit, wherein the control unit includes a timer measuring an elapsed time from the beginning of lighting of the high-pressure discharge lamp and causes the alternating current generation unit to generate an alternating current with a first waveform until the elapsed time reaches a predetermined time and to generate an alternating current with a second waveform from a point when the elapsed time reaches the predetermined time, the alternating current with the first waveform having a lower or a same absolute instantaneous value in a final section of each half-cycle period thereof compared with the other sections, the alternating current with the second waveform having a higher absolute instantaneous value in a final section of each half-cycle period thereof than in the other sections.

2. The high-pressure discharge lamp lighting apparatus of claim 1, wherein
the alternating current generation unit generates the alternating current with the first waveform while receiving a first signal and the alternating current with the second waveform while receiving a second signal, and
the control unit further includes:
a lighting waveform generator selectively generating either one of the first signal and the second signal to be input to the alternating current generation unit; and
a selector causing the lighting waveform generator to generate the first signal until the elapsed time reaches the predetermined time and causing the lighting waveform generator to generate the second signal from a point when the elapsed time reaches the predetermined time.

3. The high-pressure discharge lamp lighting apparatus of claim 1, wherein,
the predetermined time is longer than a time period from the beginning of the lighting until a temperature of the electrodes reaches a peak.

4. The high-pressure discharge lamp lighting apparatus of claim 1, wherein
the predetermined time is in a range from 30 s to 300 s inclusive.

5. The high-pressure discharge lamp lighting apparatus of claim 1, wherein
the alternating current with the first waveform has a substantially constant instantaneous value during each half-cycle period.

6. The high-pressure discharge lamp lighting apparatus of claim 1, wherein
when each half-cycle period of the alternating current is divided into an initial section, a middle section, and a final section, the alternating current with the second waveform has a lower absolute instantaneous value in the initial section than in the middle section and has a higher absolute instantaneous value in the final section than in the middle section.

7. The high-pressure discharge lamp lighting apparatus of claim 6, wherein
the second waveform is a staircase-waveform, and the absolute instantaneous value of the alternating current therewith gradually increases in a staircase-like manner in the initial section, is maintained at the same level in the middle section, and gradually increases again in the final section.

8. The high-pressure discharge lamp lighting apparatus of claim 1, wherein
the control unit further controls the alternating current generation unit so that the alternating current supplied to the high-pressure discharge lamp has a first frequency while a lamp voltage thereof is not lower than a predetermined value, and the alternating current supplied to the high-pressure discharge lamp has a second frequency which is higher than the first frequency while the lamp voltage thereof is lower than the predetermined value.

9. The high-pressure discharge lamp lighting apparatus of claim 8, wherein
the control unit further controls the alternating current generation unit so that the alternating current supplied to the high-pressure discharge lamp has a third frequency which is lower than the second frequency until the elapsed time reaches the predetermined time, regardless of the lamp voltage thereof.

10. A high-pressure discharge lamp apparatus comprising:
a high-pressure discharge lamp having an arc tube in which a halogen material is enclosed and a pair of electrodes is disposed, each electrode having a protrusion at a tip thereof; and
the high-pressure discharge lamp lighting apparatus for lighting the high pressure discharge lamp, as defined in claim 1.

11. A projector comprising:
the high-pressure discharge lamp apparatus of claim 10.

12. A high-pressure discharge lamp lighting method for supplying an alternating current to a high-pressure discharge lamp to cause lighting, the high-pressure discharge lamp having an arc tube in which a halogen material is enclosed and a pair of electrodes is disposed, each electrode having a protrusion at a tip thereof, the high-pressure discharge lamp lighting method comprising the steps of:
causing a timer to measure an elapsed time from the beginning of the lighting of the high-pressure discharge lamp
supplying an alternating current with a first waveform to the high-pressure discharge lamp until the elapsed time reaches a predetermined time, the alternating current with the first waveform having a lower absolute instantaneous value in a final section of each half-cycle period thereof than in the other sections; and
supplying an alternating current with a second waveform to the high-pressure discharge lamp from a point when the elapsed time reaches the predetermined time, the alternating current with the second waveform having a higher absolute instantaneous value in the final section of each half-cycle period thereof than in the other sections.

13. The high-pressure discharge lamp lighting method of claim 12 wherein
a first signal is input to an alternating current generation unit until the elapsed time reaches the predetermined time, and a second signal is input to the alternating current generation unit from a point when the elapsed time reaches the predetermined time, the alternating current generation unit generating the alternating current with the first waveform while receiving the first signal, and generating the alternating current with the second signal while receiving the second signal.

14. The high-pressure discharge lamp lighting method of claim 12 wherein
the predetermined time is longer than a time period from the beginning of the lighting until a temperature of the electrodes reaches a peak.

15. The high-pressure discharge lamp lighting method of claim 12 wherein
the predetermined time is in a range from 30 s to 300 s inclusive.

16. The high-pressure discharge lamp lighting method of claim 12, wherein
the alternating current with the first waveform has a substantially constant instantaneous value during each half-cycle period.

17. The high-pressure discharge lamp lighting method of claim 12, wherein, when each half-cycle period of the alternating current is divided into an initial section, a middle section, and a final section, the alternating current with the second waveform has a lower absolute instantaneous value in the initial section than in the middle section and has a higher absolute instantaneous value in the final section than in the middle section.

18. The high-pressure discharge lamp lighting method of claim 17, wherein the second waveform is a staircase-waveform, and the absolute instantaneous value of the alternating current therewith gradually increases in a staircase-like manner in the initial section, is maintained at the same level in the middle section, and gradually increases again in the final section.

19. The high-pressure discharge lamp lighting method of claim 12, wherein the alternating current supplied to the high-pressure discharge lamp has a first frequency while a lamp voltage thereof is not lower than a predetermined value, and the alternating current supplied to the high-pressure discharge lamp has a second frequency which is higher than the first frequency while the lamp voltage thereof is lower than the predetermined value.

20. The high-pressure discharge lamp lighting apparatus of claim 19, wherein the alternating current supplied to the high-pressure discharge lamp has a third frequency which is lower than the second frequency until the elapsed time reaches the predetermined time, regardless of the lamp voltage thereof.

* * * * *